No. 777,928.

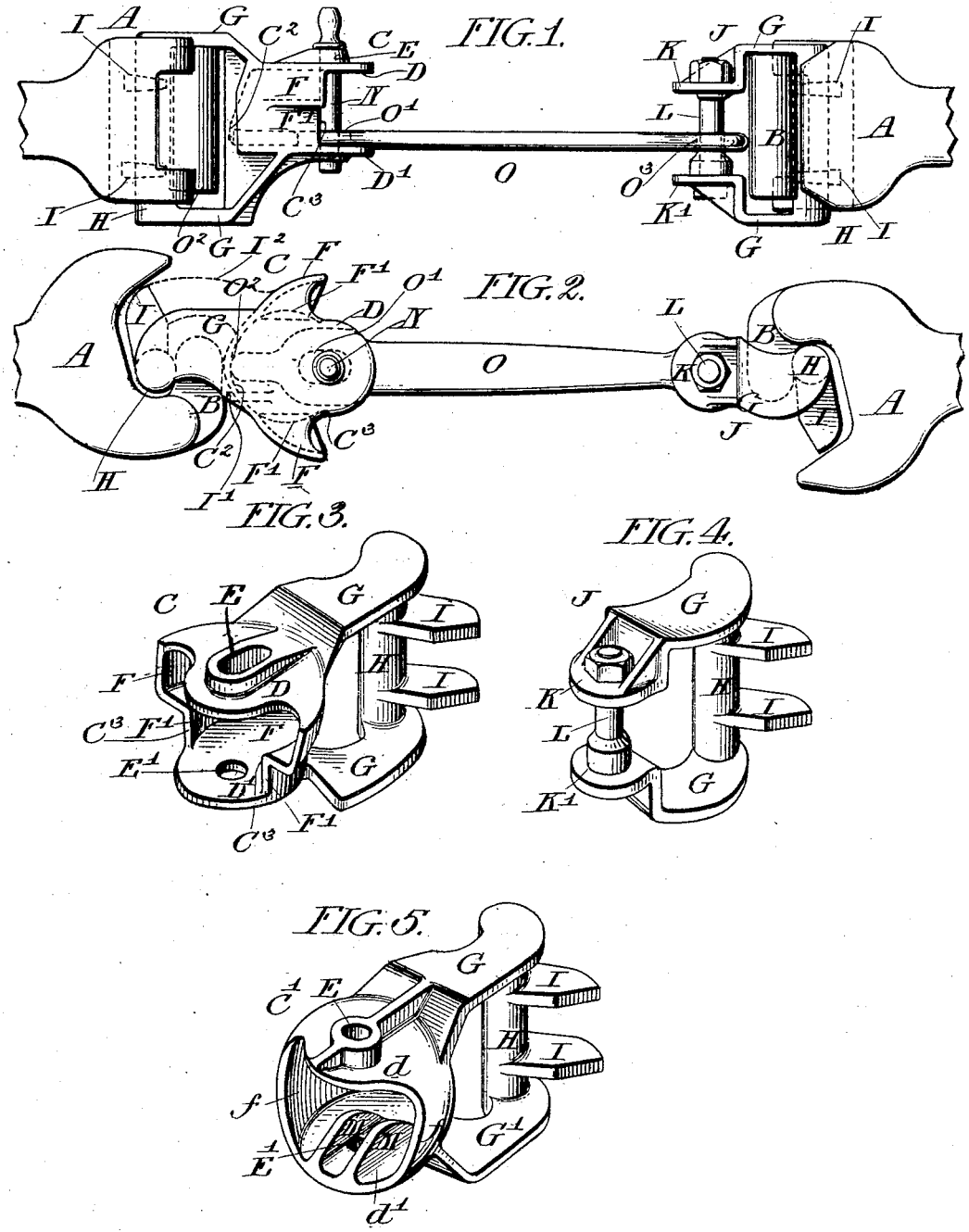

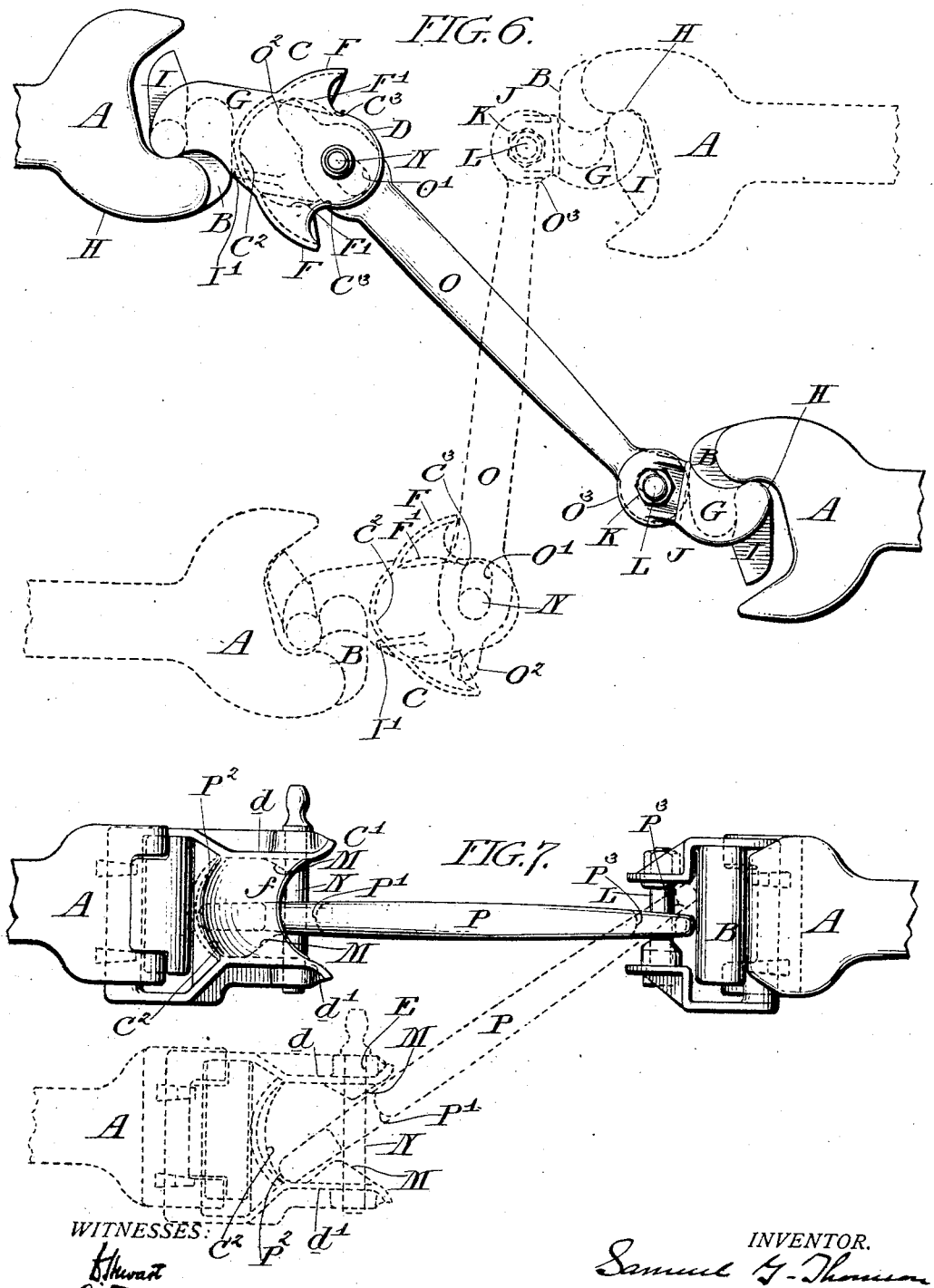

Patented December 20, 1904.

UNITED STATES PATENT OFFICE.

SAMUEL G. THOMSON, OF ALTOONA, PENNSYLVANIA.

AUXILIARY COUPLING DEVICE.

SPECIFICATION forming part of Letters Patent No. 777,928, dated December 20, 1904.

Application filed June 19, 1903. Serial No. 162,188.

*To all whom it may concern:*

Be it known that I, SAMUEL G. THOMSON, a citizen of the United States of America, residing in Juniata borough, city of Altoona, county of Blair, in the State of Pennsylvania, have invented a certain new and useful Improvement in Auxiliary Coupling Devices, of which the following is a true and exact description, reference being had to the accompanying drawings, which form a part thereof.

My invention relates to auxiliary coupling devices for railroad-cars, such devices being necessary where cars are to be moved over tracks of unusually-sharp curvature and more particularly where both sharp curvature and reversed curves exist, such devices being also necessary where there is a sharp vertical deflection of the track—such, for instance, as occurs at times in moving cars onto or from ferry-boats.

The object of my invention is to provide an auxiliary coupling device for such uses which will be useful both in pulling and pushing a coupled car and which will be safer for the men to couple and also serve to properly maintain the distance between the coupled cars without exposing the draft-rigging or the car to undue side thrust.

A further object of my invention is to provide an improved device for coupling the auxiliary coupling-heads to the regular coupling-heads; and my invention consists, first, in the special construction of a bowl-like auxiliary coupling-head; second, in the special construction of the device for coupling or connecting the auxiliary coupling devices to the regular heads; third, in the combination of parts going to make up my improved auxiliary coupling. All of these parts will be best understood as described in connection with the drawings, in which they are illustrated, and in which—

Figure 1 is a side elevation of my auxiliary coupling device connected at each end to a regular coupler, the construction illustrated being that especially adapted for use on sharp curves. Fig. 2 is a plan view of the parts illustrated in Fig. 1. Fig. 3 is a perspective view of the bowl-like auxiliary coupling-head with attached coupling device for connection with the regular head. Fig. 4 is a perspective view of the auxiliary coupling-pin with connected coupling devices for connecting it with the regular head. Fig. 5 is a perspective view of a modified form of the bowl-like coupling-head especially adapted for use where sharp vertical deflections are met with. Fig. 6 is a plan view showing in full lines my improved auxiliary coupling device connected at each end to a regular coupler and shown in extreme deflected position, said figure also showing in dotted lines similar parts connected together as in the full-line portion of the figure, but with the coupling-rod out of abutting contact with the bowl; and Fig. 7 is a side elevation showing in full lines the modified head of Fig. 5 and other parts connected for use and in dotted lines showing the bowl-like head in depressed position to illustrate the operation of the device where abrupt vertical changes of level are met with.

A A indicate the ordinary coupling-heads, B B being the knuckles of these heads.

C, Figs. 1 to 3 and Fig. 6, shows my bowl-like auxiliary coupling-head in its usual construction, $C^2$ indicating the rear end of the head, the top and bottom walls of which are indicated at D D', while the lateral walls of the head are indicated at F F and F' F', the upper walls F F being made broadly flaring, while the lower walls F' F' are placed closer together, as shown.

At E and E', I have shown the pin-holes extending through the top and bottom walls of the bowl, the upper hole E being preferably made in the form of a slot, as shown in Fig. 3, to permit the pin to tilt in case it does not engage the lower pin-hole E' and then to permit the link to free itself from the head, and at $C^3 C^3$, I have indicated the portions of the rim or edge of the bowl-like head which come in contact with the coupling rod or link under conditions to be explained. The bowl C is connected by arms G G' with a standard H, which is adapted to lie under and couple with the jaw B of a regular coupler and is provided with one or more outwardly-extending flanges or arms I, which serve as distance-pieces, preventing by contact with the outer stationary wall of the coupling-head A the disengagement of the standard H with the jaw B.

At I', I have indicated ribs which serve to limit the swing of the head C in one direction, as the parts I do in the other. For heavy work it is sometimes desirable to brace the distance-pieces I by ribs extending to the head C, as indicated in dotted lines at I², Fig. 2. It will be noticed that the upper arm G rests upon the top of the jaw B, thus preventing the disengagement of the coupled parts as long as the jaw B is in closed position, and it will also be seen that as soon as the jaw B opens the coupled standard H will at once be released from union with the coupling-head.

In Figs. 1, 2, 4, 6, and 7 I have illustrated an auxiliary coupling-pin L, secured to flanges K K', which in turn are united by arms G G with the standard H, having distance-pieces I, similar to that already described. This auxiliary coupling-pin L will not always be necessary, especially where a split jaw with a coupling-pin passing through it is employed, but the auxiliary pin is almost essential where a solid jaw is used and is preferable, even where the split knuckle and pin is available, as it relieves the knuckle from strains which would frequently permanently injure it.

N indicates the coupling-pin used in connection with the bowl-shaped head, and O is the coupling rod or link, provided with slots O' and O³, through which the pins N and L pass, and having an extension such as indicated at O², which is adapted to come in contact with the rear end of the bowl-like head C when the coupling-rod is thrust into it.

It will be noticed that when the rod O is thrust into the head C its entrance is greatly facilitated by the flaring upper walls F F of the head, so much so that a coupling can be made even in the extreme position indicated in dotted lines in Fig. 6, and that when the rod falls down between the lower walls F' F' it will be engaged by these walls by the coupling-pin E and by the rear end of head C, as shown in full lines in Fig. 6, so that the rod O cannot be forced to a greater deflection than there illustrated. I prefer the construction as shown, whereby the edges C³ of the walls F' form the fulcrum; but the pin E may also serve as the fulcrum or may coact with it as a point of support, as in the drawings, a feature of great importance, as in the absence of this engagement a great side thrust would take place between the coupled draft-riggings, which might easily injure them and under some conditions even force a car from the track.

While the head C is adapted for use in case of abrupt vertical changes of level, the modified head (shown at C' in Figs. 5 and 7) is especially adapted for use under such conditions, the inner end of the bowl-like head being curved in both directions and the top and bottom of the head (indicated at $d$ and $d'$) so united with the side walls $f\ f$ as to strengthen them to resist the spreading action of the coupling-bar when thrust upward, as shown in Fig. 7. The top and bottom walls are also preferably braced, as indicated at M, and I have shown in Fig. 7 a special connection link or bar P, not differing materially from the link O in that it has the slots P' and P³ for the pins N and L and has, like the link O, an end P², which abuts against the rear portion C¹² of the head.

Having now described my invention, what I claim as new, and desire to secure by Letters Patent, is—

1. In an auxiliary coupling for cars, the device for coupling the auxiliary coupling to the regular coupling, which consists of a standard H, adapted to engage the jaw of the coupling, said standard having one or more spacing-pieces I, extending from it, and an outwardly-extending arm G, adapted to rest on the knuckles and to support the auxiliary coupling device.

2. In an auxiliary coupling for cars, the device for coupling the auxiliary coupling to the regular coupling, which consists of a standard H, adapted to engage the jaw of the coupling, said standard having one or more spacing-pieces I, extending from it, and outwardly-extending arms G, G, the upper one of which is adapted to rest on the knuckle, and both of which support the auxiliary coupling.

3. An auxiliary coupling device for cars consisting of a bowl-like coupling-head having a pin-hole E, E', extending through its top and bottom walls, and having means for coupling it to a regular coupling.

4. An auxiliary coupling device for cars consisting of a bowl-like coupling-head having a pin-hole E, E', extending through its top and bottom walls, and having arms G, G, connecting to a standard H, adapted to lie beneath a regular coupling-knuckle and provided with one or more distance-pieces I.

5. An auxiliary coupling device for cars consisting of a bowl-like coupling-head having a pin-hole E, E', extending through its top and bottom walls, and its rim disposed to contact with an engaged coupling-rod when said rod is deflected to a determined degree.

6. An auxilary coupling having in combination a bowl-like coupling-head provided with means to couple it to a regular coupling and having a pin N, extending through it, an auxiliary coupling-pin L, provided with means for coupling it to a regular coupling, and a coupling-rod O, having pin-slots O', and O³, for connecting it to pins N, and L, and an end extension O², arranged to contact with the rear end and sides of the bowl-like coupling-head when pushed into said head, and when angling therewith.

7. The auxiliary coupling-head C, having the broadly-flaring upper walls F, F, and the narrower lower walls F', F', and means for coupling said head to a regular coupler.

SAMUEL G. THOMSON.

Witnesses:
 RU DURHAM,
 W. J. HAMOR.